United States Patent
Aoki et al.

(10) Patent No.: US 8,288,974 B2
(45) Date of Patent: Oct. 16, 2012

(54) POWER SUPPLY CONTROL DEVICE FOR CONTROLLING POWER SUPPLY CONNECTED TO MOTOR

(75) Inventors: Mikiyuki Aoki, Toyohashi (JP); Kunio Furukawa, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 363 days.

(21) Appl. No.: 12/770,219

(22) Filed: Apr. 29, 2010

(65) Prior Publication Data

US 2010/0284673 A1 Nov. 11, 2010

(30) Foreign Application Priority Data

May 8, 2009 (JP) ................................. 2009-113176

(51) Int. Cl.
*H02P 3/14* (2006.01)
(52) U.S. Cl. ............ 318/376; 318/375; 363/63; 363/65; 323/282
(58) Field of Classification Search .................. 318/376, 318/375; 363/63, 55; 323/282; 388/821, 388/816
See application file for complete search history.

(56) References Cited

U.S. PATENT DOCUMENTS

| | | | | |
|---|---|---|---|---|
| 6,630,810 B2 * | 10/2003 | Takemasa et al. | ............ | 320/104 |
| 6,631,082 B2 * | 10/2003 | Birumachi | ...................... | 363/97 |
| 7,151,364 B2 * | 12/2006 | Kimura et al. | ................ | 323/282 |
| 7,304,461 B2 * | 12/2007 | Watanabe et al. | ............ | 323/282 |
| 7,504,811 B2 * | 3/2009 | Watanabe et al. | ............ | 323/282 |
| 7,808,195 B2 * | 10/2010 | Kitanaka et al. | ............. | 318/442 |
| 7,911,079 B2 * | 3/2011 | Hoff et al. | .................... | 307/10.1 |

FOREIGN PATENT DOCUMENTS

JP 2005-278348 A 10/2005
JP 2006-180629 A 7/2006

* cited by examiner

*Primary Examiner* — Rita Leykin
(74) *Attorney, Agent, or Firm* — Buchanan Ingersoll & Rooney PC

(57) ABSTRACT

A power supply control device controls a power supply connected to a motor and includes: an AC/DC converter that makes a first DC power supply; a DC/DC converter that makes a second DC power supply out of the first DC power supply; a first rectifying element that allows current to flow from the first DC power supply toward the motor; a second rectifying element that allows current to flow from the first DC power supply toward the DC/DC converter; and a third rectifying element that allows current to flow from the motor toward the DC/DC converter. In this way, a power supply connected to a motor can be suitably controlled.

19 Claims, 9 Drawing Sheets

POWER SUPPLY CONTROL DEVICE FOR CONTROLLING POWER SUPPLY CONNECTED TO MOTOR

This application is based on Japanese Patent Application No. 2009-113176 filed with the Japan Patent Office on May 8, 2009, the entire content of which is hereby incorporated by reference.

BACKGROUND OF THE INVENTION

1. Field of the Invention

The present invention relates to a power supply control device, and more particularly, a power supply control device that controls a power supply connected to a motor.

2. Description of the Related Art

An image forming device in which paper is transported by rollers and an image is formed (i.e. printed) on that paper (e.g. an MFP (Multi-Function Peripheral) that features scanning, facsimile, copying, printing, data communication and server functions, or a facsimile device, a copier, a printer or the like) includes a motor for driving a paper transport roller, a developing device, an intermediate transfer belt or the like.

Conventionally, a motor is generally controlled by consuming regenerative energy from the motor by resistance to generate heat. Alternatively, regenerative energy may be accumulated by an accumulator, in which case the accumulator may be connected to, or disconnected from, the power supply line depending on the voltage of the accumulator.

Document 1, specified below, discloses a device that utilizes regenerative energy from a DC motor in which a battery is charged with regenerative power from the motor. The battery is connected to the drive power supply for the motor via a switch and energy accumulated in the battery is used when the motor is started up.

Document 2, specified below, discloses a switching power supply device in which, when the motor drive voltage exceeds a predetermined level, a battery is charged with regenerative energy from the motor, which is then used during the energy-saving mode.

[Document 1] JP 2005-278348 A
[Document 2] JP 2006-180629 A

In an image forming device with high-speed operation, the slowing-down time of the motor must be minimized. To shorten the slowing-down time, the rotational energy that the motor has must be quickly disposed of.

On the other hand, a method that consumes regenerative energy from the motor by resistance to generate heat wastes valuable energy.

If regenerative energy is accumulated in an accumulator and is connected directly to a power supply line depending on the accumulated voltage, the voltage on this power supply line varies significantly. Therefore, this method cannot be used with a load that requires high precision in voltage. Furthermore, it is difficult to supply current from an accumulator when a large amount of current is required. Therefore, switching is necessary to supply current from an accumulator during energy saving or under other conditions.

In other words, if the technique of Document 1 is employed, the battery accumulating regenerative power from the motor is directly connected to the motor drive power supply, leading to unstable voltage, making the technique unsuitable for a drive power supply for a motor or the like.

The technique of Document 2 also provides a configuration in which the battery is charged during regeneration and is then connected directly to the output in response to an energy-saving mode signal, and is disconnected when the motor drive voltage becomes sufficiently low. Thus, the output voltage varies significantly. Another problem is that the energy saving mode signal must be provided.

SUMMARY OF THE INVENTION

The present invention was made to solve the above-mentioned problems. An object of the present invention is to provide a power supply control device that is capable of suitably controlling a power supply connected to a motor.

To achieve the above object, according to an aspect of the present invention, the power supply control device is a power supply control device for controlling a power supply connected to a motor, including: a DC/DC converter making, out of a first DC power supply, a second DC power supply; a first element for allowing current to flow from the first DC power supply toward the motor; a second element for allowing current to flow from the first DC power supply toward the DC/DC converter; and a third element for allowing current to flow from the motor toward the DC/DC converter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image forming device according to various embodiments of the present invention will be described below.

An image forming device includes printing functions through which paper or the like is transported by a roller and printing is performed on that paper or the like using an electrophotographic method.

First Embodiment

Figure 1:
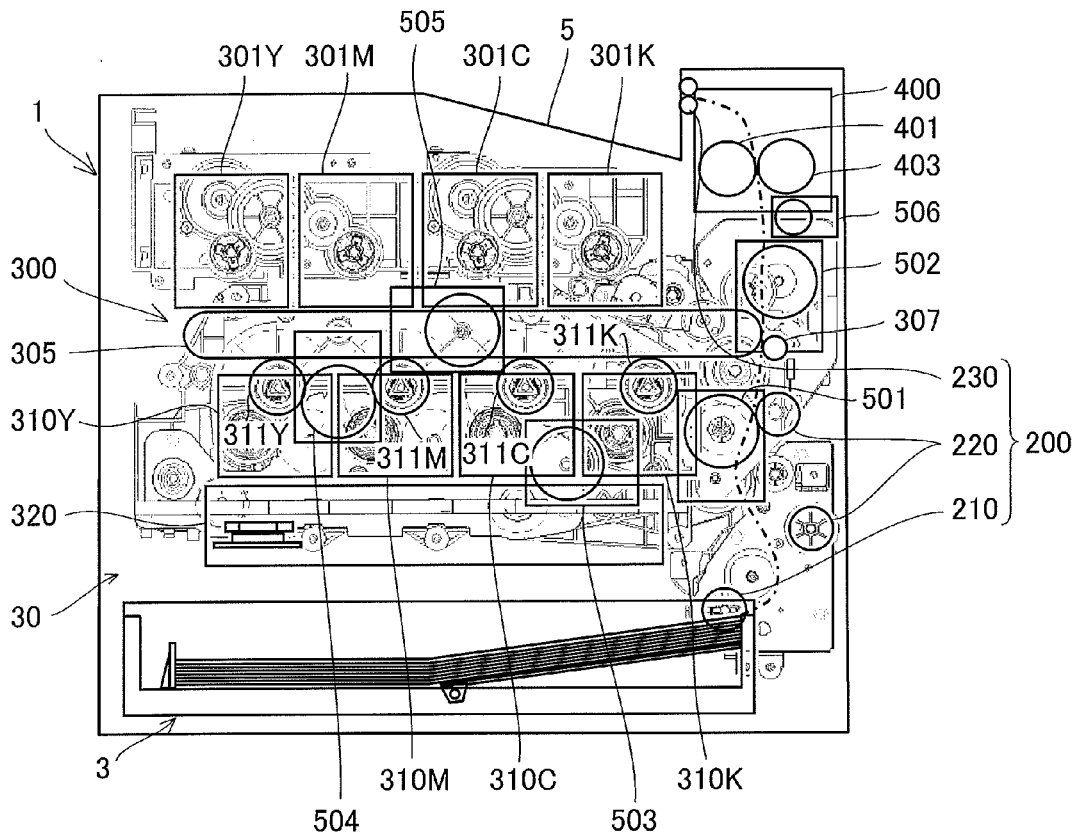
FIG. 1 is a side view showing a hardware configuration of an image forming device according to a first embodiment of the present invention.

Referring to FIG. 1, image forming device 1 includes a paper cassette 3, a catch tray 5 and a printing unit 30.

Paper cassette 3 is disposed at the bottom part of image forming device 1 and is removable from the housing of image forming device 1. During printing, a sheet loaded into a paper cassette 3 is fed into a sheet transporting path in the device from paper cassette 3, one by one, and is moved to printing unit 30. It should be noted that more than one paper cassette 3 may be provided.

Catch tray 5 is disposed on top of the housing of image forming device 1. A sheet on which an image has been formed by printing unit 30 is discharged from inside the housing to catch tray 5.

Printing unit 30 is disposed within the housing of image forming device 1. Printing unit 30 generally includes a paper transport unit 200, a toner image forming unit 300, a fixing device 400, and a drive unit (shown in FIG. 3) 500. Printing unit 30 is configured to combine images in four different colors, i.e. C, M, Y and K, using a so-called tandem method, thereby forming a color image on a sheet.

Paper transport unit 200 is composed of a feed roller 210, a transport roller 220, a discharge roller 230 (each of them represents an example of a roller) and other components. Feed roller 210 picks up a sheet from the paper cassette. Transport roller 220 and discharge roller 230 each transports a sheet, in which two opposite rollers, for example, that sandwich the sheet are rotated. Feed roller 210 feeds one sheet at a time from paper cassette 3. The sheet is fed into the sheet transporting path in the housing of image forming device 1 by feed roller 210. Transport roller 220 transports the sheet fed by feed roller 210 to toner image forming unit 300. Further, transport roller 220 transports the sheet that has passed fixing device 400 to discharge roller 230. Discharge roller 230 discharges the sheet that has been transported by transport roller 220 to the outside of the housing of image forming device 1. It should be noted that paper transport unit 200 may include other rollers used to transport a sheet or for other purposes.

Toner image forming unit 300 is composed of four toner bottles 301Y, 301M, 301C and 301K for different colors (also referred to as toner bottles 301), an intermediate transfer belt 305, a transfer roller (an example of a roller) 307, four development units 310Y, 310M, 310C and 310K (also referred to as development units 310), a laser scanning unit 320, and other components.

Yellow toner bottle 301Y, magenta toner bottle 301M, cyan toner bottle 301C and black toner bottle 301K store yellow (Y), magenta (M), cyan (C) and black (K) toners, respectively.

Figure 2:
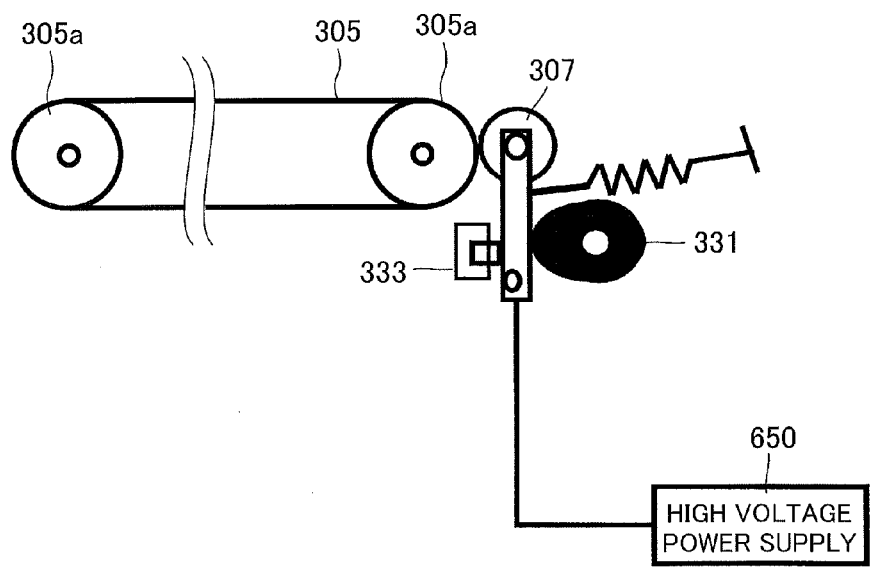
FIG. 2 shows a configuration of a pressing/separating mechanism of a transfer roller.

Intermediate transfer belt 305 forms a loop and is laid around two rollers 305a (shown in FIG. 2). Intermediate transfer belt 305 is rotated in a synchronized manner with paper transport unit 200. Transfer roller 307 is positioned facing the portion of intermediate transfer belt 305 that is in contact with one roller 305a. The distance between transfer roller 307 and intermediate transfer belt 305 is regulated by a pressing/separating mechanism, as described below. A sheet is sandwiched and transported by intermediate transfer belt 305 and transfer roller 307.

A development unit 310 includes a photoreceptor drum 311 (photoreceptor drums 311Y, 311M, 311C and 311K are provided for their respective development units), a development device, a cleaner, an electrifying device, and other components. Yellow development unit 310Y, magenta development unit 310M, cyan development unit 310C and black development unit 310K are arranged so as to form Y, M, C and K images, respectively. Development units 310 are arranged side by side directly below intermediate transfer belt 305. Laser scanning unit 320 is located so that it can scan photoreceptor drums 311 with a laser beam.

In toner image forming unit 300, laser scanning unit 320 forms a latent image on photoreceptor drums 311, which have been electrified in a unified manner by the electrifying device, based on image data for colors Y, M, C and K. The development device forms toner images in different colors on their respective photoreceptor drums 311. Photoreceptor drums 311 transfer the toner images onto intermediate transfer belt 305 to form, on intermediate transfer belt 305, a mirror image of the toner image that is to be formed on the sheet (primary transfer). Then, transfer roller 307, to which a high voltage has been applied, transfers the toner image formed on intermediate transfer belt 305 onto the sheet, thereby forming a toner image on the sheet (secondary transfer).

When a development unit 310 runs short of toner following image forming, toner kept in the corresponding one of toner bottles 301 is supplied to that development unit to enable continuous image forming.

Fixing device 400 has a heating roller (an example of a roller) 401 and a pressure roller (an example of a roller) 403. Fixing device 400 transports a sheet, on which a toner image is formed, by means of heating roller 401 and pressure roller 403 that work together to sandwich the sheet, and heats and presses it together. In this way, fixing device 400 melts the toner adhering to the sheet and fixes it on the sheet, thereby forming an image on the sheet. The sheet that has passed fixing device 400 is discharged by discharge roller 230 from the housing of image forming device 1 onto catch tray 5.

Drive unit 500 has, for example, a main motor (an example of a motor) 501, a fixing motor (an example of a motor) 502, a black development motor (an example of a motor) 503, a color development motor (an example of a motor) 504, a color photoreceptor motor (an example of a motor) 505, and a pressing/separating motor (an example of a motor) 506 (all of these motors may also be referred to as motors 501-506 or the like). Drive unit 500 is driven under the control of CPU 21, as described below. Main motor 501 enables sheet transporting, from the feeding step to the transfer step, and drives intermediate transfer belt 305 and black photoreceptor drum 311K. Fixing motor 502 drives fixing device 400. Black development motor 503 drives black development unit 310K. Color development motor 504 drives yellow, magenta and cyan development units 310Y, 310M and 310C. Color photoreceptor motor 505 drives yellow, magenta and cyan photoreceptor drums 311Y, 311M and 311C. Pressing/separating motor 506 adjusts the sandwiching pressure on a sheet at transfer roller 307 and fixing device 400, as described below.

When image forming device 1 is instructed to perform printing, a recording medium, such as paper, stored in paper cassette 3 is picked up by feed roller 210, one by one. The recording medium is transported by feed roller 210 and transport roller 220. Parallel to feeding, laser unit 320 exposes electrified photoreceptors 311Y, 311M, 311C and 311K to light based on image data, develops images with toner in development units 310Y, 310M, 310C and 310K to form toner images on the photoreceptors, and applies a voltage to primary transfer rollers to transfer the toner on the photoreceptors onto intermediate transfer belt 305, thereby forming a combined toner image in four colors. Next, a voltage is applied to transfer roller 307 to transfer the toner image on intermediate transfer belt 307 onto the transported recording medium. The toner image on the recording medium passes fixing device 400, where heat and pressure are applied, and is thus fixed on the recording medium. The recording medium with the toner image fixed is discharged by discharge roller 230 onto the catch tray.

When one of development units 310Y, 310M, 310C and 310K runs short of toner following image forming, toner kept in the corresponding one of toner bottles 301Y, 301M, 301C and 301K is supplied to that development unit.

A drive motor for a photoreceptor or the like must be driven with high precision, or it will produce an uneven image. Thus, the power supply voltage for driving a motor must be stable. In the configuration of FIG. 1, each motor is constructed of a DC brushless motor. Driving a motor using the circuitry described below will achieve high-precision driving as well as meaningful use of regenerative energy.

Further, a flywheel with high inertia may be attached to a photoreceptor or the like to stabilize the rotation of the motor. That will result in large regenerative energy and save a significant amount of energy.

FIG. 2 shows a configuration of a pressing/separating mechanism of transfer roller 307.

Transfer roller 307 has a spring that gives it a tension toward the right in the drawing. A pressing/separating cam 331 is connected to pressing/separating motor 506 and abuts onto a member that supports transfer roller 307. Pressing/separating cam 331 is rotated to cause transfer roller 307 to abut onto, or come away from, intermediate transfer belt 305. Conditions of pressing and separating are detected by a pressing/separating position sensor 333.

Transfer roller 307 is connected to a high voltage power supply 650. Transfer roller 307 is in use while a voltage is applied to it.

Figure 3:
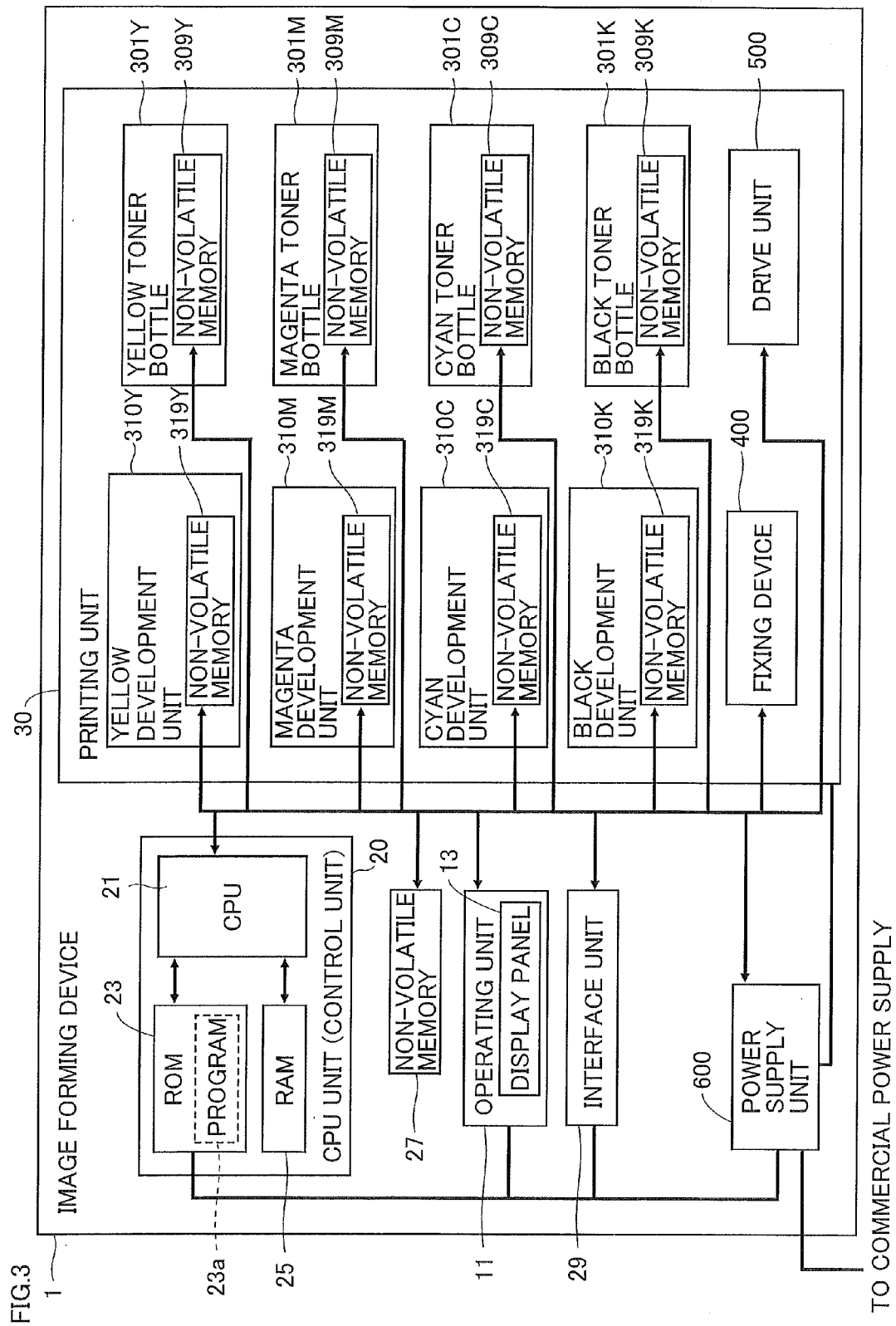
FIG. 3 is a block diagram showing a configuration of the image forming device.

FIG. 3 is a block diagram showing a configuration of image forming device 1.

Referring to the figure, image forming device 1 further includes an operating unit 11, a control unit (i.e. a CPU module) 20, a non-volatile memory 27, an interface unit 29, a power supply unit 600.

Operating unit 11 is positioned on the housing of image forming device 1 so that a user can operate it. A display panel 13 is arranged on operating unit 11. Display panel 13 may be, for example, a liquid crystal display (LCD) that includes a touch panel. Display panel 13 displays a guidance screen to the user, or displays an operation button so that it can accept a touch operation by the user. Display panel 13 displays under the control of CPU 21 of control unit 20. When display panel 13, an operation button (not shown) or the like is operated by the user, operating unit 11 sends a corresponding operation signal or a predetermined command to CPU 21. That is, the user can cause various operations in image forming device 1 by operating unit 11.

Control unit 20 has a CPU 21, a read-only memory (ROM) 23, a random-access memory (RAM) 25, and other components. Control unit 20, as well as operating unit 11, non-volatile memory 27, interface unit 29 and power supply unit 600, is connected to a system bus. Thus, control unit 20 and components of image forming device 1 are connected to each other to communicate a signal.

CPU 21 controls various operations in image forming device 1 by performing, for example, a control program 23a stored in ROM 23, RAM 25, non-volatile memory 27 or the like. In response to an operation signal from operating unit 11 or an operation command from a client PC or the like, CPU 21 performs a predetermined control program 23a. Thus, a predetermined operation is performed in image forming device 1 in response to, for example, an operation made upon operating unit 11 by the user.

ROM 23 may be, for example, a flash ROM (or flash memory). ROM 23 stores data to be used for performing an operation in image forming device 1. Further, ROM 23 stores a control program (or program) 23a for performing various operations in image forming device 1. In addition, ROM 23 may store function-setting data or the like for image forming device 1. CPU 21 performs a predetermined process to read data from ROM 23 or write data in ROM 23. It should be noted that ROM 23 may be unrewritable.

RAM 25 is the main memory for CPU 21. RAM 25 is used to store data needed for CPU 21 to perform control program 23a, as described below.

Non-volatile memory 27 stores information that must be kept even after a power-off of image forming device 1, such as information relating to life states, such as the number of printed sheets. Further, non-volatile memory 27 stores, for example, job data that has been sent from outside via interface unit 29. Non-volatile memory 27 may also be configured to store, for example, setting information for image forming device 1, or a control program for performing various operations in image forming device 1. Non-volatile memory 27 is capable of storing a plurality of jobs sent from one client PC, a plurality of client PCs or the like. Non-volatile memory 27 is constructed of, for example, a hard disk drive (HDD) or a flash ROM.

Interface unit 29 is constructed of, for example, hardware such as a network interface card (NIC) combined with software that communicates using a predetermined communication protocol. Interface unit 29 connects image forming device 1 to an external network such as a LAN. In this way, image forming device 1 is allowed to communicate with an external device, such as a client PC, connected to the external network. Image forming device 1 is capable of receiving a job from a client PC. Further, image forming device 1 is capable of sending image data to a client PC or send it in an e-mail via a mail server. It should be noted that interface unit 29 may be configured to be capable of connecting to an external network via wireless communication. Further, interface unit 29 may be a universal serial bus (USB) interface, for example. In that case, interface unit 29 enables communication between an external device, connected to it via a communication cable, and image forming device 1.

Power supply unit 600 is provided inside the housing of image forming device 1. Power supply unit 600 is connected to the commercial power supply and supplies components of the device with electric power from the commercial power supply.

In the present embodiment, non-volatile memories 319Y, 319M, 319C and 319K are provided in development units 310Y, 310M, 310C and 310K, respectively. Further, non-volatile memories 309Y, 309M, 309C and 309K are provided in toner bottles 301Y, 301M, 301C and 301K, respectively.

Each development unit 310 has a certain lifespan since photoreceptor drum 311 and the like in development unit 310 deteriorate as printing is repeated. Toner bottle 301, too, has a certain lifespan since toner stored in it decreases as printing is performed. In other words, a development unit 310 and a toner bottle 301 are consumables (these may also be referred to as consumables 710). CPU 21 stores information such as the life state for each consumable in the appropriate one of non-volatile memories 319Y-319K and 309Y-309K (these may also be referred to as non-volatile memories 719). Thus, even when a consumable is removed and mounted on another image forming device, the life state for that consumable can be reflected at this image forming device. Thus, the life of each consumable can be managed properly and an image can be printed appropriately.

Figure 4:
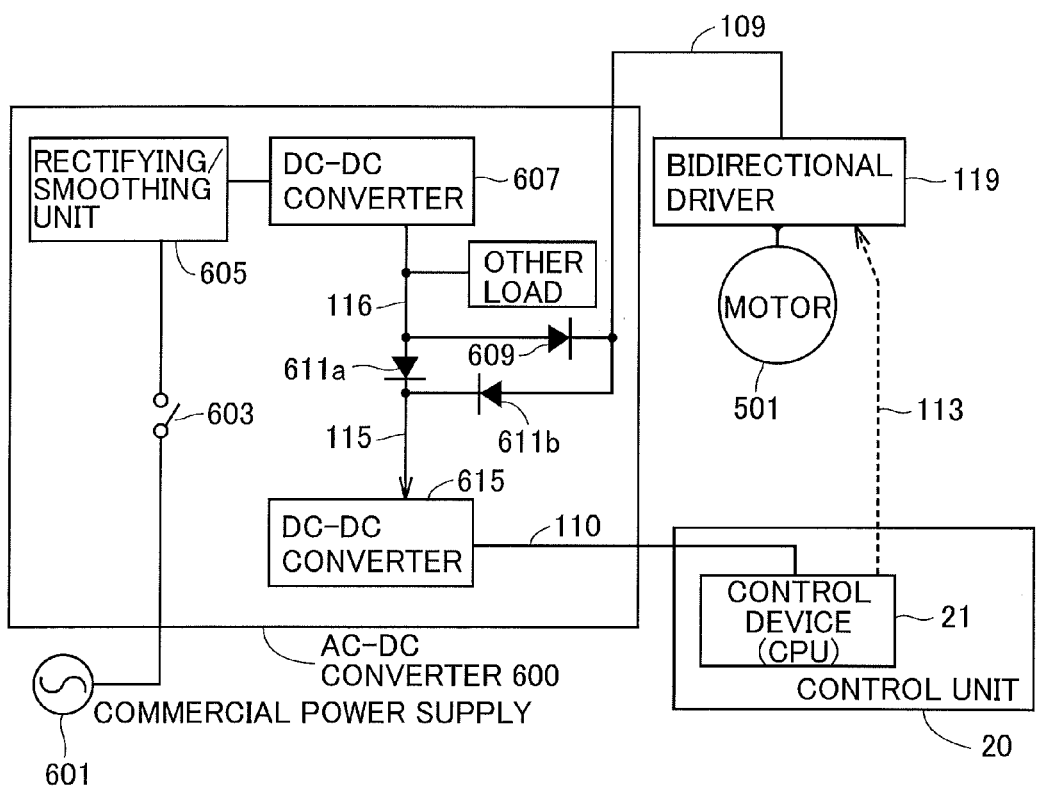
FIG. 4 is a block diagram showing a circuit configuration of drive components for an image forming device, particularly a power supply unit and a drive unit.

FIG. 4 is a block diagram showing a circuit configuration of drive components for image forming device 1, particularly a power supply unit 600 and a drive unit 500.

Power supply unit (i.e. an AC/DC converter) 600 is driven when the commercial power supply is input via a power supply plug 601. Power supply unit 600 has a main power supply switch 603, a rectifying/smoothing unit 605, a first DC/DC converter 607, diodes 609, 611a and 611b (diodes 611a and 611b form a maximum selection unit), and a second DC-DC converter 615. Main power supply switch 603 switches the input of the AC supply on and off.

Rectifying/smoothing unit 605 converts alternating current input from the commercial power supply into direct current. First DC/DC converter 607 converts a DC voltage to make stable, low-voltage direct current. In the present embodiment, first DC/DC converter 607 outputs a 24V DC voltage. First DC/DC converter 607 outputs a DC voltage via diode 609 to a motor 501 of drive unit 500. Further, first DC/DC converter 607 outputs a DC voltage to diode 611a, which forms part of the maximum selection unit. Note that diode 609 is disposed so that, when regenerative power is produced in drive unit 500, as described below, this current will not flow into first DC/DC converter 607. This is to prevent damage to first DC/DC converter 607.

In drive unit 500, motor 501 is driven when it is supplied with a 24V DC voltage output from first DC/DC converter 607 under the control of CPU 21. It should be noted that motors 502-506 may be driven by the circuitry of FIG. 4.

The maximum selection unit has two diodes 611a and 611b. Diode 611a is disposed on the connection route between first DC/DC converter 607 and second DC/DC converter 615, with its anode connected to first DC/DC converter 607. Diode 611b is disposed on the connection route between second DC/DC converter 615 and a bidirectional driver 119, with its anode connected to bidirectional driver 119. Two diodes 611a and 611b are disposed parallel, with their cathodes connected with each other. The maximum selection unit outputs a DC voltage to second DC/DC converter 615 from the one of two diodes 611a and 611b that has a higher voltage. Note that diodes 611a and 611b prevent the backflow of current from the one of diodes 611a and 611b that has a higher voltage to the one with a lower voltage.

It should be noted that a smoothing unit that has a smoothing capacitor may be provided between the cathodes of diodes 611a and 611b and second DC/DC converter 615. This is to smooth DC pulse current output from the maximum selection unit.

Second DC/DC converter 615 converts a DC voltage to make stable, low-voltage current. According to the present embodiment, second DC/DC converter 615 outputs a 3.3V DC voltage that is a signal-based power supply to control unit 20. It should be noted that second DC/DC converter 615 may be configured to output a 5V DC voltage, for example.

Control unit 20 is operated when it is supplied with a 3.3V DC voltage from second DC/DC converter 615. CPU (i.e. control device) 21 communicates with ROM (i.e. non-volatile memory) 23 or the like to read a control program or write data to control image forming device 1. CPU 21 writes information about image forming device 1, such as life information, into ROM 23. Further, CPU 21 communicates with a non-volatile memory mounted on a consumable to write information, such as life information about the consumable, into the non-volatile memory.

In the present embodiment, CPU 21 monitors the output voltage from first DC/DC converter 607, i.e. monitors whether electric power is being supplied or not. Power supply conditions can be monitored by, for example, dividing the output voltage from first DC/DC converter 607 by a resistance and detecting this voltage by CPU 21. In this way, CPU 21 can detect a commercial supply stoppage due to a power outage, or a power-off of supply after main power supply switch 603 is turned off. It should be noted that CPU 21 may monitor power supply conditions using any of other detection methods.

In Japan, AC 100V is input for commercial power supply 601. This commercial power supply is input into AC/DC converter 600 to provide a motor drive DC voltage and a control DC voltage. In AC/DC converter 600, commercial power supply 601 is first input into rectifying/smoothing unit 605 via power supply switch 603. Here, the AC power supply is rectified full-wave and smoothed by an electrolytic capacitor to provide about a 120-140V DC voltage.

This DC voltage is input into first DC/DC converter 607 and insulated by first DC/DC converter 607 to provide a stabilized drive power supply (i.e. a drive power supply line) 116. Generally, 24V is employed for drive power supply 116. Drive power supply 116 is connected to bidirectional driver 119 of DC brushless motor 501 via diode 609. Bidirectional driver 119 is connected to DC brushless motor 501 to control the rotation of the motor based on a speed instruction signal 113 from control device 21.

Drive power supply 116 is connected to the input of second DC/DC converter 615 via diode 611a. The input of second DC/DC converter 615 is also connected to a motor drive line 109, which provides the input for bidirectional driver 119, via diode 611b.

Thus, second DC/DC converter 615 converts a DC voltage that varies between around 23V-30V into a stable voltage for control power supply line 110. Generally, 3.3V is employed for the voltage for control power supply line 110.

The output 3.3V voltage on control power supply line 110 is supplied to control device 21, such as a CPU, in control unit 20.

The output of first DC/DC converter 607 may also be connected to other loads, such as a solenoid or a fan motor.

Normally, motor 501 rotates at a number of rotations designated by a rotation instruction from control unit 20. When motor 501 is quickly slowed down by a rotation instruction 113, bidirectional driver 119 connected to the motor puts the motor in the generator mode. Thus, the rotational energy of motor 501 is returned to motor drive line 109 (toward the power supply). Thus, the voltage on motor drive line 109 becomes 24V or higher. Diode 611b becomes conductive when the voltage on motor drive line 109 becomes 24V+ (i.e. the barrier voltage of diode 611b or higher).

The voltage on input line 115 for DC/DC converter 615 charges an electrolytic capacitor inside DC/DC converter 615. Diode 611b becoming conductive increases the voltage on input line 115 for DC/DC converter 615. Even when the input voltage for DC/DC converter 615 varies, the voltage on control power supply line 110 does not vary since a feedback control for controlling the voltage is performed in DC/DC converter 615.

Further, diode 609 prevents a regenerative voltage from flowing onto drive power supply line 116 that provides the output line for DC/DC converter 607. Thus, other loads, such as a clutch or solenoid, connected to drive power supply line 116, are not affected.

When power supply switch 603 is turned off, the input voltage for DC/DC converter 607 gradually decreases. This causes the voltage on drive power supply line 116 to decrease gradually as well, putting motor 501 in the regeneration mode. At this time, the voltage on input line 115 for DC/DC converter 615 is kept for a longer period of time due to regenerative power. This provides a time interval in which the regenerative power can be used to complete the saving of the hard disc drive (HDD) and other operations.

Figure 5:
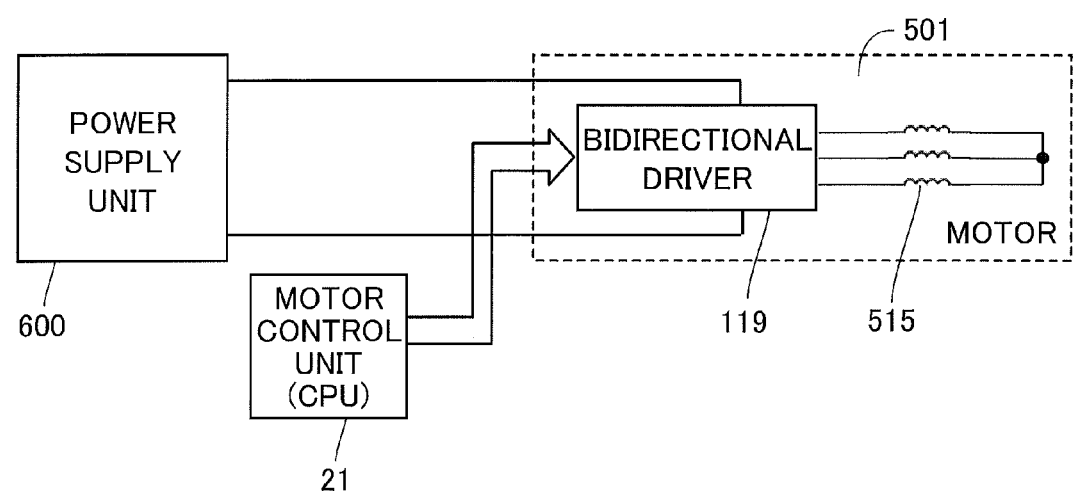
FIG. 5 is a block diagram showing drive circuitry for the motor.

FIG. 5 is a block diagram showing drive circuitry for motor 501.

The drive circuitry for motor 501 will be described below referring to the drawing. The configuration of the drive circuitry for each of motors 502-506 is similar to that of motor 501.

Motor 501 is a DC brushless motor. Motor 501 has a bidirectional driver 119 and a winding 515. Power supply unit 600 supplies motor 501 with a DC voltage. The DC voltage from power supply unit 600 is applied to bidirectional driver 119. CPU (i.e. motor control unit) 21 outputs a control instruction such as a speed instruction to bidirectional driver 119. In response to a control instruction to drive motor 501, bidirectional driver 119 of motor 501 supplies winding 515 with electric power supplied by power supply unit 600 to generate motive power for motor 501. If bidirectional driver 119 is instructed to stop motor 501, it stops supplying winding 515 with electric power, thereby stopping motor 501.

In the present embodiment, motor 501 is configured to be controllable by regenerative braking in a braking mode (or a braking method). Regenerative braking is performed when CPU 21 sets regenerative braking as a braking mode. If bidirectional driver 119 is instructed by CPU 21 to slow down when the regenerative braking mode is set, bidirectional driver 119 is operated to perform regenerative braking for motor 501. When regenerative braking is performed, motion energy of motor 501 and a member that moves along with the rotating motor is converted to electrical energy (regenerative power) at winding 515. The produced regenerative power is supplied from bidirectional driver 119 to power supply unit 600. It should be noted that, between power supply unit 600 and motor 501, drive power and regenerative power may be supplied by a shared electric line or separate lines.

Motor 501 is configured to be capable of using other braking modes, such as a braking method using so-called short braking or a braking method (i.e. stopping method) using so-called free run. With bidirectional driver 119 being controlled, these braking modes are performed when a slowing-down instruction is issued if CPU 21 has set the short-braking mode or free-run mode. Here, the free-run mode means simply turning off the power supply to motor 501 to let motor 501 cease to move; the short-braking mode means forming a closed circuit that only includes motor 501 to turn off the power supply to motor 501, using bidirectional driver 119 to short-circuit counter electromotive force generated by motor 501 that is rotated by inertia, and converting the energy into heat to brake motor 501. CPU 21 is configured to be capable of selecting a braking mode based on conditions. Thus, motor 501 or the like can be braked based on operating conditions in image forming device 1.

For braking controls for motor 501 during a normal image forming operation, stop controls by free run, stop controls in the short-braking mode or stop controls in the regenerative braking mode may be employed. The motor may be stopped quickly using the regenerative braking mode or short braking, or the motor may be kept at the rotational state for a longer period of time in the free-run mode. It should be noted that motor 501 may be configured to be brakable using other braking methods such as the reverse braking mode, in which reverse current is forced upon it.

In this way, during motor regeneration, the voltage on motor drive line 109 for driving the motor, which has been increased by the regenerative voltage, is input into input line 115 of DC/DC converter 615.

Second Embodiment

In the following description of an image forming device according to a second embodiment, similar components to those in the first embodiment will be labeled with the same numerals and will not be described again.

Figure 6:
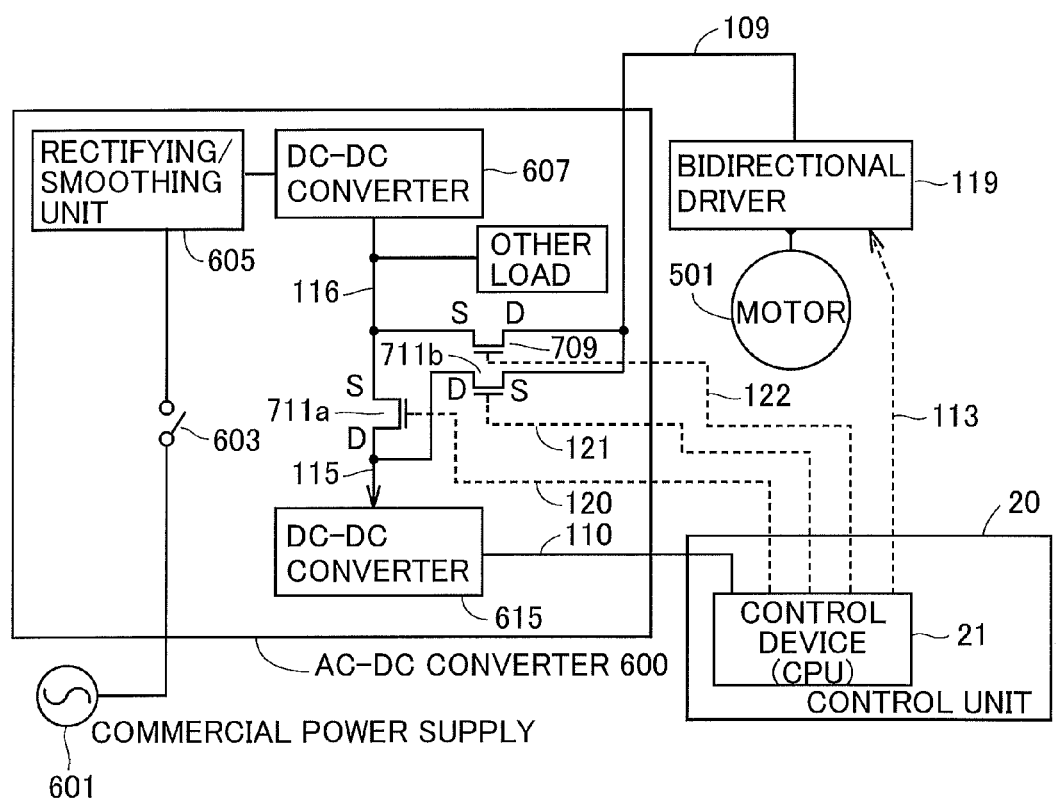
FIG. 6 is a block diagram showing a circuit configuration of drive components for an image forming device, particularly a power supply unit and a drive unit, according to a second embodiment.

FIG. 6 is a block diagram showing a circuit configuration of drive components for an image forming device 1, particularly a power supply unit 600 and a drive unit 500, according to the second embodiment of the present invention.

In the circuitry of FIG. 6, compared with that of FIG. 4, diodes 609, 611a and 611b are replaced with MOS field-effect transistors (MOSFETs) 709, 711a and 711b. Using these MOSFETs for synchronous rectification will reduce loss. A MOSFET is a type of transistor.

MOSFETs 709, 711a and 711b are arranged in such a way that their drain-source parasitic diodes are connected in the same direction as diodes 609, 611a and 611b of FIG. 4 with respect to their anodes and cathodes. Thus, the configuration of FIG. 6 is similar to that of FIG. 4 when all the MOSFETs are turned off. The gate electrodes of MOSFETs 709, 711a and 711b are controlled by control signals 122, 121 and 120, respectively, output from control device (CPU) 21.

Figure 7:
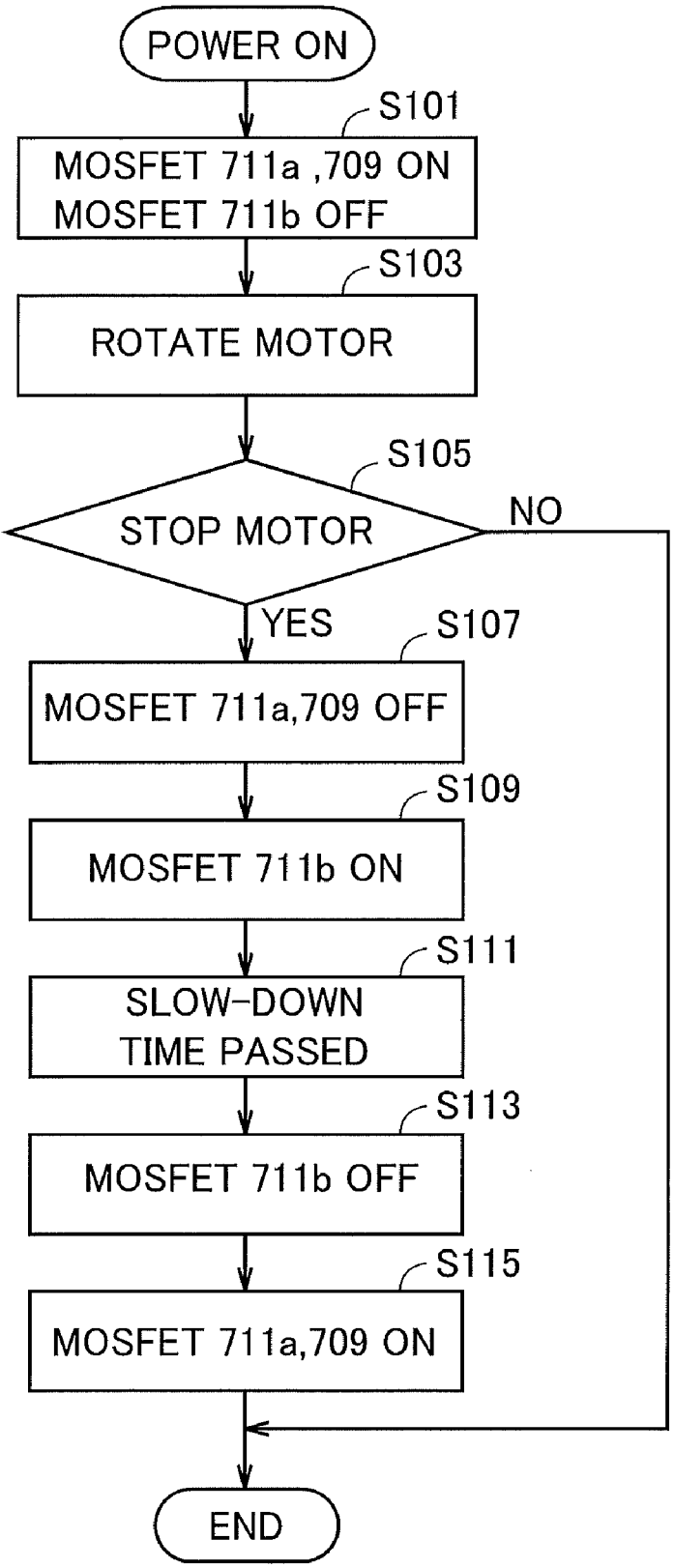
FIG. 7 is a flow chart illustrating a method of controlling MOSFETs 709, 711*a* and 711*b*.

FIG. 7 is a flow chart illustrating a method of controlling MOSFETs 709, 711a and 711b.

Referring to the chart, when the power supply of the device is turned on, step S101 first turns on MOSFET 711a connected to drive power supply line 116 and input line 115 for DC/DC converter 615, and MOSFET 709 connected to motor drive line (i.e. motor input) 109.

At this time, MOSFET 711b connected to the line used to input regenerative power into DC/DC converter 615 is off.

Then, at step S103, motor 501 is started (rotated) in response to an instruction by control device 21. The MOSFETs remain in their respective states even after the motor is started. Thereafter, when the motor is to be stopped (or slowed down) (YES at S105), MOSFET 711a, first, and MOSFET 709 are turned off at step S107 in order to avoid variation in the voltage on drive power supply line 116.

Then, at step S109, MOSFET 711b is turned on. Thereafter, at step S111, the process waits for a slowing-down time during which motor 501 discharges all its regenerative energy. After the slowing-down time, MOSFET 711b is turned off at step S113 to provide the same state as the power-on initial state.

Next, at step S115, MOSFET 711a and MOSFET 709 are turned on. This synchronous rectification will reduce loss by the barrier voltage of the diodes in each mode.

[Exemplary Configuration of DC/DC Converter]

DC/DC converter 615 that makes a control power supply out of a drive power supply can be constructed of step-down chopper circuitry.

Figure 8:
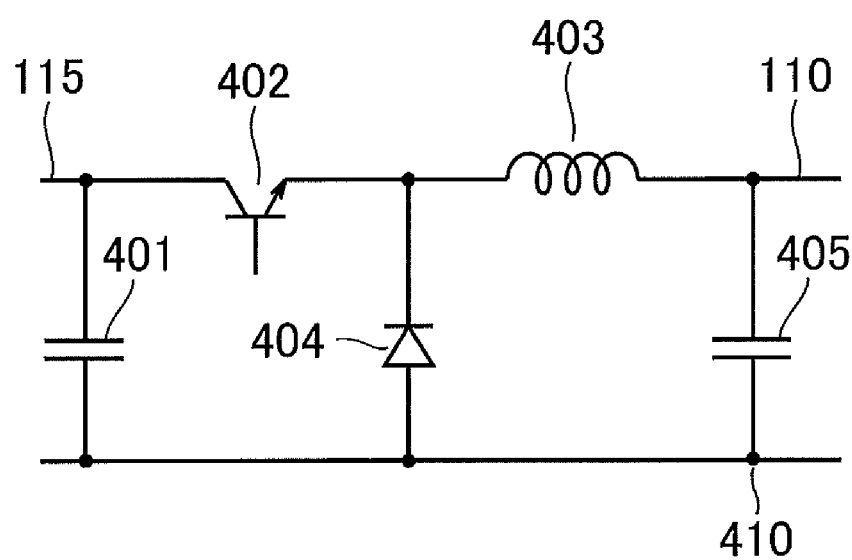
FIG. 8 is a circuit diagram of DC/DC converter 615 constructed of a stepping-down chopper circuit.

FIG. 8 is a circuit diagram of DC/DC converter 615 constructed of a stepping-down chopper circuit.

An input electrolytic capacitor 401 is connected between the input line (drive voltage) 115 and GND 410 of DC/DC converter 615. The high-voltage side of input electrolytic capacitor 401 is connected to the collector terminal of a chopper transistor 402. Chopper transistor 402 has an emitter terminal connected to the cathode of flywheel diode 404. Flywheel diode 404 has an anode connected to GND 410. The cathode of flywheel diode 404 is connected to electrolytic capacitor 405 via a reactor 403. The voltage between the two ends of electrolytic capacitor 405 forms the control voltage.

Suppose that the drive voltage is 24V and the control voltage is 3.3V. If the 24V voltage is turned on and off at a duty of 3.3/24 at transistor 402, current flows through transistor 402 when the transistor is on. When the transistor is off, current flows through diode 404, with the current being smoothed by reactor 403 and electrolytic capacitor 405. As a result, the output remains constant at 3.3V. If the output voltage is monitored and is made constant by carefully controlling the on and off of transistor 402, the output voltage will remain constant at 3.3V even when the input voltage varies.

Third Embodiment

In the following description of an image forming device according to a third embodiment, similar components to those in the first embodiment will be labeled with the same numerals and will not be described again.

Figure 9:
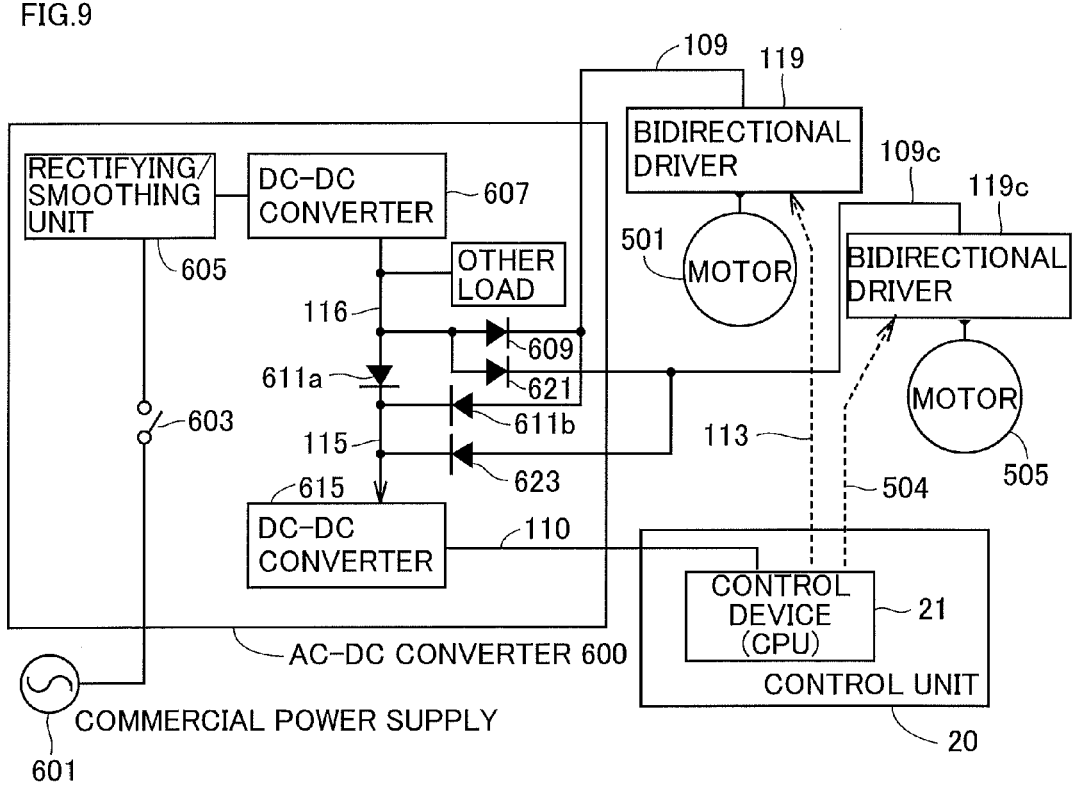
FIG. 9 is a block diagram showing a circuit configuration of drive components for an image forming device, particularly a power supply unit and a drive unit, according to a third embodiment.

FIG. 9 is a block diagram showing a circuit configuration of drive components for an image forming device 1, particularly a power supply unit 600 and a drive unit 500, according to a third embodiment of the present invention.

Compared with the circuitry of FIG. 4, the circuitry of FIG. 9 further includes a motor 505, a bidirectional driver 119c connected with the motor, a diode 621 with an anode connected to drive power supply line 116 and a cathode connected to drive line 109c of motor 505, and a diode 623 with a cathode connected to input line 115 of DC/DC converter 615 and an anode connected to drive line 109c of motor 505.

In FIG. 9, motor 501 is the main motor for driving the black photoreceptor, while motor 505 is a motor for driving the color photoreceptors (see FIG. 1). Motors 501 and 505 are controlled by control signals 113 and 504, respectively, from control unit 111.

Diodes 621 and 623 are added to the configuration of FIG. 4 on drive power supply line 116 for the motors and on input line 115 for DC/DC converter 615, respectively. The other parts of the configuration and the other operations in AC/DC converter 600 are similar to those in FIG. 4.

In the configuration of FIG. 9, regenerative energy from each of the motors does not interfere with one another and is independently returned to input line 115 of DC/DC converter 615. Thus, energy can be regenerated while the drive voltage is maintained with high precision.

Fourth Embodiment

In the following description of an image forming device according to a fourth embodiment, similar components to those in the first embodiment will be labeled with the same numerals and will not be described again.

Figure 10:
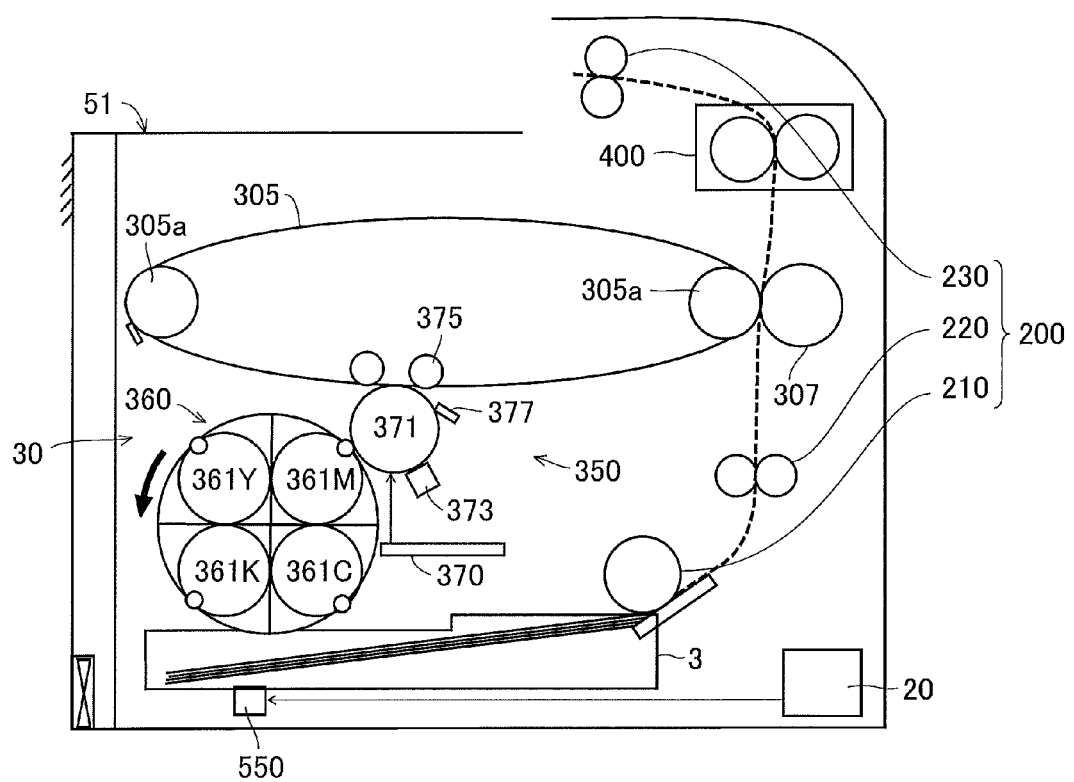
FIG. 10 is a cross-sectional side view showing a hardware configuration of an image forming device according to a fourth embodiment.

FIG. 10 is a cross-sectional side view showing a hardware configuration of an image forming device 51 according to a fourth embodiment.

An image forming device 51 is a so-called four-cycle machine. Image forming device 51 has a toner image forming unit 350 that includes a development rack unit (an example of a moving member) 360, a photoreceptor drum 371, an intermediate transfer belt 305, a transfer roller 307 and other components. Photoreceptor drum 371 is located close to both intermediate transfer belt 305 and development rack unit 360. Around photoreceptor drum 371 are arranged an electrifying device 373, an opposing roller (an example of a roller) 375, a laser scanning unit 370 and other components. Electrifying device 373 electrifies photoreceptor drum 371. Laser scanning unit 370 exposes photoreceptor drum 371 to light in an image pattern. Opposing roller 375 is disposed to work together with photoreceptor drum 371 to sandwich intermediate transfer belt 305 in order to perform the primary transfer of a toner image formed on photoreceptor drum 371.

Four cartridges (developing devices) 361C, 361M, 361Y and 361K corresponding to colors C, M, Y and K (also referred to as cartridges 361) can be mounted on development rack unit 360. Each cartridge 361 is composed of toner, a developing roller that uses that toner for development, and other components.

Development rack unit 360 is rotatable. During image forming, CPU 21 causes development rack unit 360 to be rotated to rotate each of cartridges 361, one after another, to a development position that is opposite to photoreceptor drum 371. Thus, a toner image is formed (i.e. developed) on photoreceptor drum 371 on which a latent image has been formed by laser scanning unit 370. For each of colors Y, M, C and K, photoreceptor drum 371 is electrified, exposed to light and used for development, one color after another, so that the formed toner image is transferred to intermediate transfer belt 305 using opposite roller 375. After toner images in four different colors are superimposed on each other on intermediate transfer belt 305, the sheet is pressed by transfer roller 307 to perform the secondary transfer of the formed toner image. The sheet with the transferred toner image undergoes the fixing step at fixing device 400 before being discharged by discharge roller 230.

Drive unit 500 of image forming device 51 has a rack drive motor (an example of a motor, and an example of a moving member) 550 to rotationally drive development rack unit 360. CPU 21 controls the rotation of rack drive motor 550 to control the rotational drive of development rack unit 360.

As long as an image forming operation is not performed, development rack unit 360 remains still at a waiting position that provides a predetermined state (i.e. a rotational phase). When an image forming operation is completed properly, CPU 21 returns development rack unit 360 from its development position to its waiting position. When development rack unit 360 is at its waiting position, the user, when opening the housing for maintenance or other purposes, is allowed to replace a cartridge 361 easily. Development rack unit 360 also includes a cover member or the like so that the user, when opening the housing while the rack unit is at its waiting position, does not get in direct contact with a developing roller or toner. Further, when an image forming operation is initiated while development rack unit 360 is at its waiting position, the rack unit is configured to be capable of moving development rack unit 360 to its development position immediately to enable development using toner of the appropriate color.

According to the fourth embodiment, the motor is regenerative-braked in a similar manner to the above first to third embodiments. Regenerative braking is performed on, for example, rack drive motor 550 or other motors.

Any of the power supply control devices shown in FIGS. 4, 6 and 9 can also be used in the fourth embodiment.

Effects of Embodiments

A power supply control device in any of the above configurations generates a first DC power supply (drive power supply line) provided by an AC/DC converter. The first DC power supply is connected to a bidirectional driver (i.e. bidirectional bridge control circuit) 119 via a first rectifier (diode 609) having its anode connected to the first DC power supply. The first rectifier is an example of a rectifying element that allows current to flow from the first DC power supply toward a motor (DC brushless motor).

One or more motors are connected to bidirectional driver 119. The power supply control device forms a second DC power supply out of the first DC power supply at DC/DC converter 615. The second DC power supply is a control power supply.

The first DC power supply is connected to the input of DC/DC converter 615 via a second rectifier (i.e. diode 611*a*) with its anode connected to the first DC power supply. The input of bidirectional driver 119 is connected to the input of DC/DC converter 615 via a third rectifier (i.e. diode 611*b*) with its anode connected to the input of the bidirectional driver. Regenerative energy from the motor is input into DC/DC converter 615 to be utilized.

While the motor is being driven, the motor is supplied with power from the driving power supply via a diode. During regeneration by the motor, the diode is in a reverse position to block the flow of current to the driving power supply. Thus, the driving voltage does not vary.

As to the control power supply formed by the DC/DC converter from the driving power supply, the input voltage for the DC/DC converter varies due to regenerative voltage; since the DC/DC converter only controls the output voltage so that it remains constant, the output voltage does not change in precision even when the input voltage for the converter varies. In this way, the power supply control device according to any one of the embodiments has a simple configuration and still enables meaningful use of regenerative energy without affecting the voltage precision of the driving power supply and the control power supply.

As to power-off, when regeneration occurs due to a momentary stoppage or in other circumstances, the output of the control power supply that is the output of the DC/DC converter can be kept for a longer period of time. Thus, a certain time period can be provided to enable the saving of the HDD or the like, which will be necessary when a momentary stoppage occurs.

The first DC power supply may also be connected to the input of bidirectional driver 119 via a MOSFET 709, which is another example of a rectifier that allows current to flow from the first DC power supply toward the motor. MOSFET 709 is turned off when regeneration occurs at the motor or when the motor is stopped.

Further, the first DC power supply may be connected to the input of DC/DC converter 615 via a MOSFET 711*a*. MOSFET 711*a* is turned off when regeneration occurs at the motor or when the motor is stopped.

Further still, bidirectional driver 119 may be connected to the input of DC/DC converter 615 via a MOSFET 711*b*. MOSFET 711*b* is turned on when regeneration occurs at the motor or when the motor is stopped.

The DC/DC converter may be constructed of any of step-down, step-up and step-up/down chopper circuits.

While the DC brushless motor is being slowed down, motor current can be returned to the drive power supply by decreasing the frequency which designates the number of rotations of the motor. The regenerative energy is used as the input power supply for the DC/DC converter for making the control power supply, which is constantly consumed.

The drive power supply is connected to the motor having the bidirectional driver, the motor having the bidirectional driver is connected to the input of the DC/DC converter, and the drive power supply is connected to the input of the DC/DC converter via a rectifying element each, such as a diode or a MOSFET. This simple configuration will enable meaningful use of regenerative energy and provide a drive power supply and an accompanying control power supply that do not vary in voltage. In other words, regenerative energy generated when the motor is stopped can be used in a meaningful manner while the precision for the power supply is maintained. Further, this energy can always be used without switching a circuit for energy saving or other purposes.

That is, in each of the embodiments, regenerative power is used for the input into the DC/DC converter so that the energy can be used in a meaningful manner without a problem even when the voltage of the regenerative power is unstable.

The above motor may be constructed of a DC brushless motor, and may be used as a motor for electrophotography.

[Others]

It should be noted that the CPU may also be configured to perform regenerative braking only with a specified motor.

Also, in the fourth embodiment described above, regenerative power may also be generated by regenerative-braking the rack drive motor for driving the development rack unit. Larger regenerative power can be generated for a longer period of time by regenerative-braking a motor that works together with a large member having large motion energy during an operation, such as a development rack unit.

The image forming device may be a monochrome/color copier, printer, facsimile device or the like. Further, the image forming device may be a multi-function peripheral (MFP) with scanning, copying, printing, facsimile, data communication and server functions. Scanning functions scan a manuscript that has been set in, and store the image on an HDD or the like. Copying functions print it on paper or the like. Printer functions print it on paper in response to a print instruction from an external terminal such as a PC. Facsimile functions receive facsimile data from an external facsimile device or the like, and store it on an HDD or the like. Data communication functions send or receive data to or from an external device that is connected with it. Server functions enable data stored on an HDD or the like to be shared by a plurality of user.

The image forming device may not form an image by means of an electrophotographic method, and may form an image by means of a so-called ink jet method, for example.

Further, the processes in the above embodiments may be performed by software or hardware circuitry.

Alternatively, a program for executing the processes of the above embodiments may be provided, or a CD-ROM, a flexible disc, a hard disc, a ROM, a RAM, a memory card or other storage media storing that program may be provided for the user. Further, the program may be transmitted via the Internet or other communication lines and downloaded to a device. The processes described above referring to the flow chart are executed by a CPU or the like according to that program.

According to the above embodiments, a power supply control device, as well as an image forming device, may be provided that is capable of suitably controlling a power supply connected to a motor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power supply control device for controlling a power supply connected to a motor, comprising:
   a DC/DC converter making, out of a first DC power supply, a second DC power supply;
   a first element for allowing current to flow from the first DC power supply toward the motor;
   a second element for allowing current to flow from the first DC power supply toward the DC/DC converter; and
   a third element for allowing current to flow from the motor toward the DC/DC converter.

2. The power supply control device according to claim 1, wherein
   the motor is connected to a bidirectional driver;

the first element allows current to flow from the first DC power supply toward the bidirectional driver; and the third element allows current to flow from the bidirectional driver toward the DC/DC converter.

3. The power supply control device according to claim 1, wherein at least one of the first to third elements is a diode that allows current to flow from its anode toward its cathode.

4. The power supply control device according to claim 1, wherein at least one of the first to third elements is a transistor.

5. The power supply control device according to claim 1, wherein the first element is a field-effect transistor that is turned off when regeneration occurs at the motor or when the motor is stopped.

6. The power supply control device according to claim 1, wherein the second element is a field-effect transistor that is turned off when regeneration occurs at the motor or when the motor is stopped.

7. The power supply control device according to claim 1, wherein the third element is a field-effect transistor that is turned on when regeneration occurs at the motor or when the motor is stopped.

8. The power supply control device according to claim 1, wherein the DC/DC converter is any of step-down, step-up, and step-up/down chopper circuits.

9. The power supply control device according to claim 1, wherein the second DC power supply output from the DC/DC converter is a control power supply.

10. The power supply control device according to claim 1, wherein the motor is a motor for an image forming device.

11. An image forming device comprising a power supply control device for controlling a power supply connected to a motor, the power supply control device including:
a DC/DC converter making, out of a first DC power supply, a second DC power supply;
a first element for allowing current to flow from the first DC power supply toward the motor;
a second element for allowing current to flow from the first DC power supply toward the DC/DC converter; and
a third element for allowing current to flow from the motor toward the DC/DC converter.

12. The image forming device according to claim 11, wherein
the motor is connected to a bidirectional driver;
the first element allows current to flow from the first DC power supply toward the bidirectional driver; and
the third element allows current to flow from the bidirectional driver toward the DC/DC converter.

13. The image forming device according to claim 11, wherein at least one of the first to third elements is a diode that allows current to flow from its anode toward its cathode.

14. The image forming device according to claim 11, wherein at least one of the first to third elements is a transistor.

15. The image forming device according to claim 11, wherein the first element is a field-effect transistor that is turned off when regeneration occurs at the motor or when the motor is stopped.

16. The image forming device according to claim 11, wherein the second element is a field-effect transistor that is turned off when regeneration occurs at the motor or when the motor is stopped.

17. The image forming device according to claim 11, wherein the third element is a field-effect transistor that is turned on when regeneration occurs at the motor or when the motor is stopped.

18. The image forming device according to claim 11, wherein the DC/DC converter is any of step-down, step-up, and step-up/down chopper circuits.

19. The image forming device according to claim 11, wherein the second DC power supply output from the DC/DC converter is a control power supply.

* * * * *